United States Patent [19]

Prest

[11] Patent Number: 5,667,251
[45] Date of Patent: Sep. 16, 1997

[54] UNIVERSAL WASTE WATER OUTLET COUPLING

[76] Inventor: J. David Prest, P.O. Box 23929, Tempe, Ariz. 85285

[21] Appl. No.: 528,440

[22] Filed: Sep. 14, 1995

[51] Int. Cl.⁶ .................................... F16L 25/06
[52] U.S. Cl. ...................... 285/12; 285/361; 285/376; 285/396
[58] Field of Search .................... 285/360, 361, 285/401, 402, 376, 73, 396, 12, 175, 275, 278

[56] References Cited

U.S. PATENT DOCUMENTS

| | | | |
|---|---|---|---|
| 337,867 | 3/1886 | Richards | 285/376 X |
| 793,869 | 7/1905 | Anderson | 285/361 X |
| 799,497 | 9/1905 | Robinson | 285/361 X |
| 1,589,469 | 6/1926 | Homand | 285/376 X |
| 2,712,457 | 7/1955 | Kimbro | 285/278 |
| 3,279,828 | 10/1966 | MacFarland | 285/12 X |
| 4,017,103 | 4/1977 | Lorkowski | 285/402 X |
| 4,133,347 | 1/1979 | Mercer | 285/402 X |
| 4,650,224 | 3/1987 | Smith | 285/376 X |
| 4,660,860 | 4/1987 | Todd | 285/12 |
| 4,688,833 | 8/1987 | Todd | 285/175 |
| 4,708,370 | 11/1987 | Todd | 285/12 |
| 4,722,556 | 2/1988 | Todd | 285/12 |
| 4,758,027 | 7/1988 | Todd | 285/177 |

*Primary Examiner*—Terry Lee Melius
*Assistant Examiner*—Heather Shackelford
*Attorney, Agent, or Firm*—Cahill, Sutton & Thomas P.L.C.

[57] ABSTRACT

A coupling having an extending repositionable discharge tube for engagement with a discharge hose is mechanically lockably attachable to either of two different conventional waste water discharge outlets mounted on a recreational vehicle. Each of the waste water discharge outlets includes a set of four equiangularly spaced dogs and the set of dogs on each discharge outlet is differently configured. The coupling includes a different set of locking slots disposed at each end for receiving and lockingly engaging a corresponding one of the two sets of dogs. The discharge tube is relocatable to extend from one end of the coupling to permit engagement of the set of slots in the other end of the coupling with the set of dogs corresponding with the discharge outlet.

13 Claims, 2 Drawing Sheets

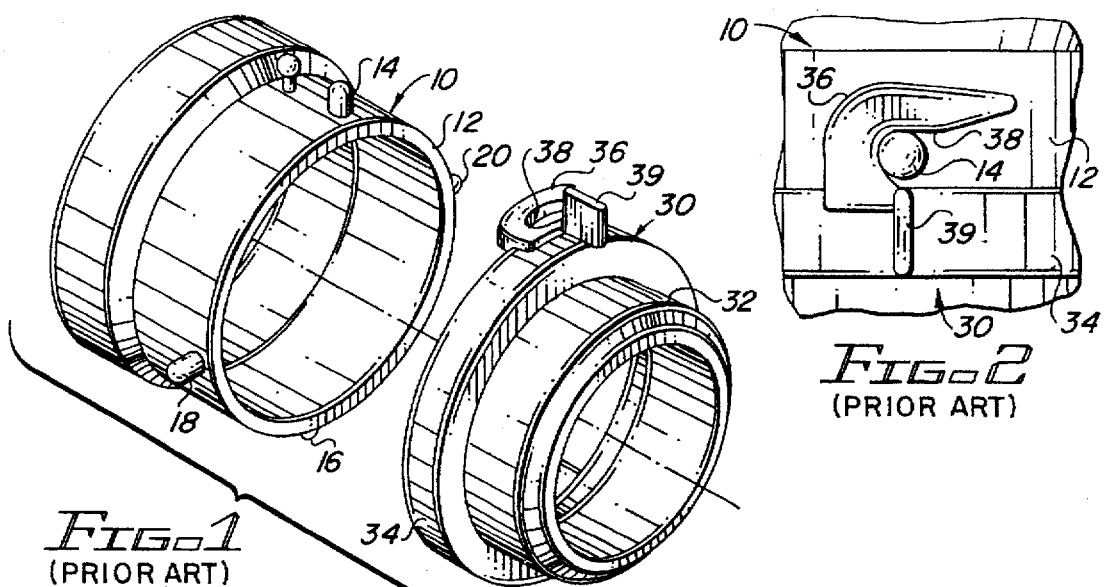
FIG-1 (PRIOR ART)
FIG-2 (PRIOR ART)
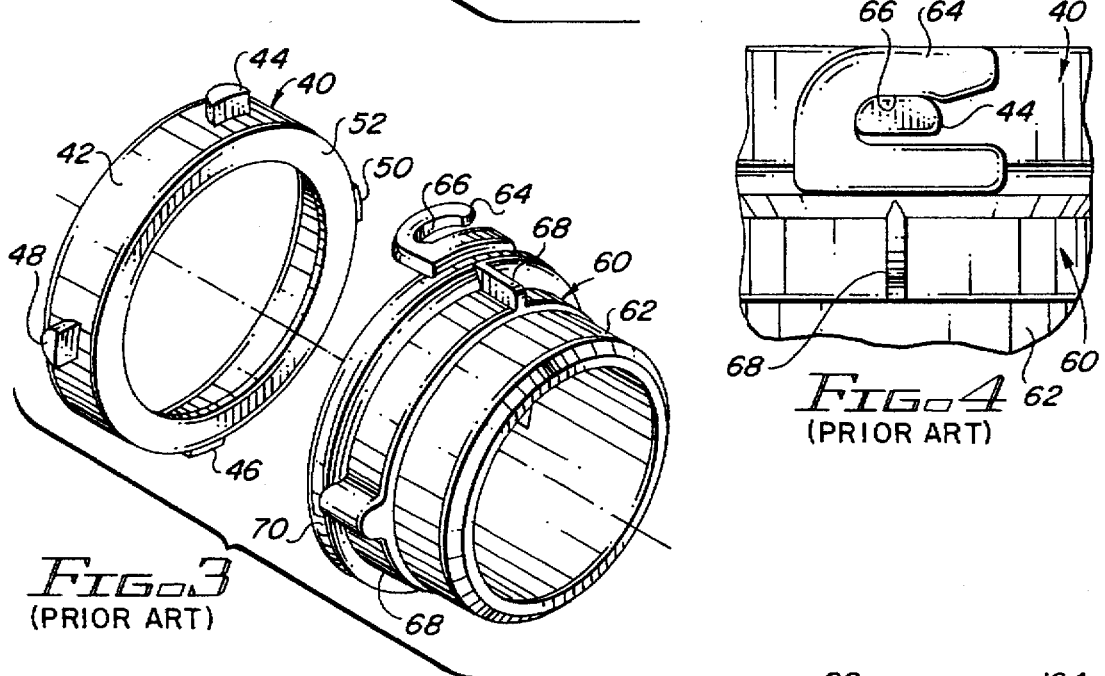
FIG-3 (PRIOR ART)
FIG-4 (PRIOR ART)
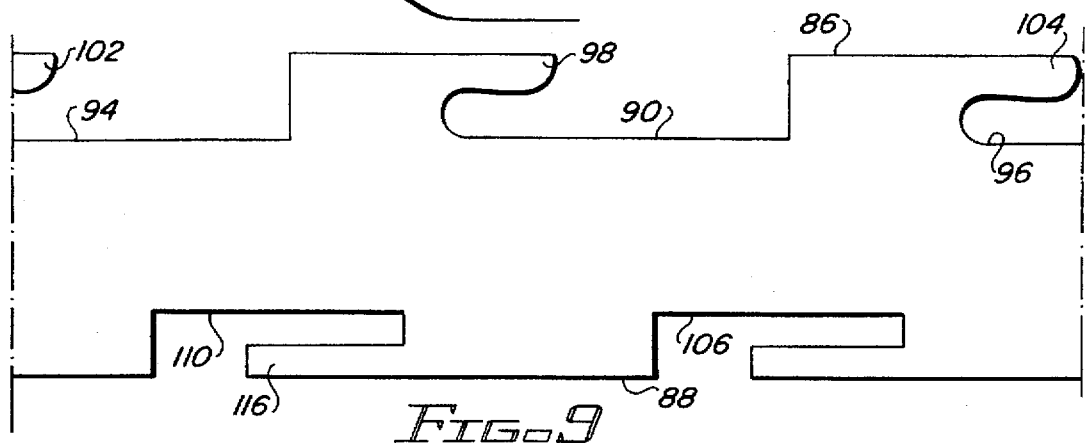
FIG-9

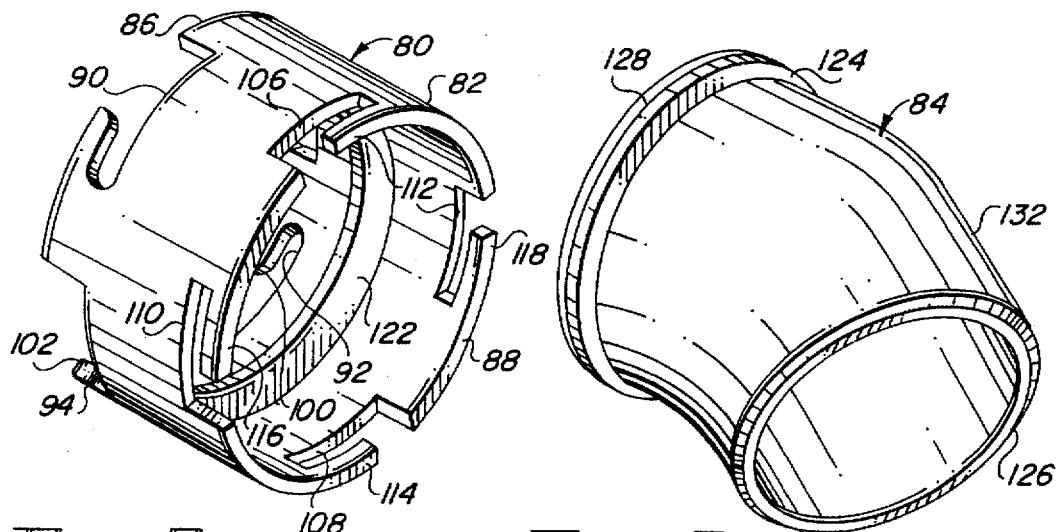
FIG. 5    FIG. 6
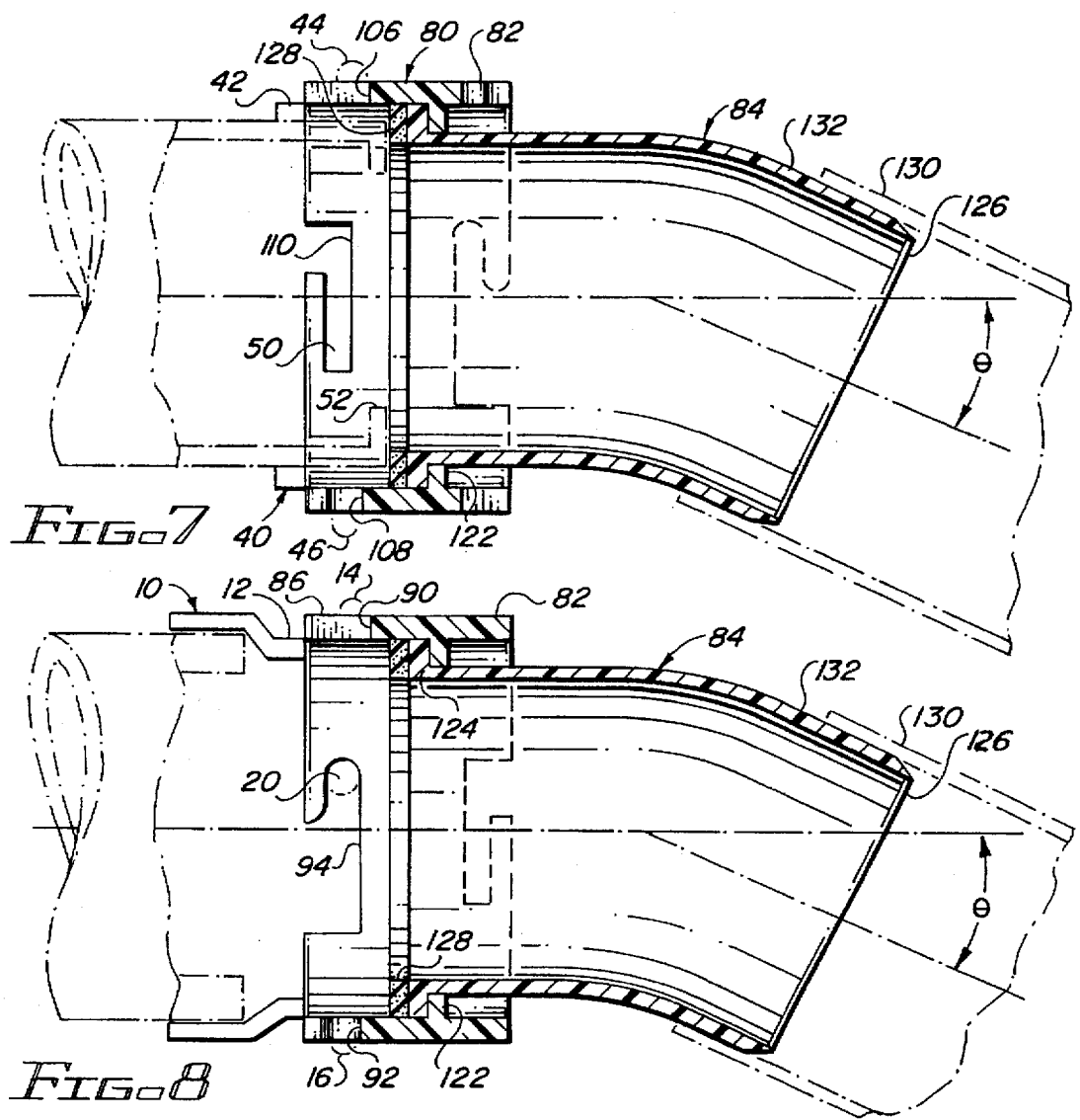
FIG. 7
FIG. 8

UNIVERSAL WASTE WATER OUTLET COUPLING

BACKGROUND OF THE INVENTION

1. Field of the Invention

The present invention relates to couplings for waste water outlets of recreational vehicles and, more particularly, to a coupling for attaching a waste water discharge hose to either of two different types of conventional outlets.

2. Description of Related Art

Recreational vehicles generally include an outside accessible outlet for discharging waste water. A conventional three-inch diameter discharge hose is connected to the outlet through a fitting that is locked onto the outlet. The waste water outlet may be one of two types of conventional configurations. The first type includes two pairs of diametrically opposed dogs formed by cylindrical pegs extending radially outwardly. To engage such an outlet, the fitting, to which the discharge hose is attached, includes a single pair of diametrically opposed hook protrusions for engaging a pair of the two pairs of diametrically opposed dogs. A second type of outlet is similar except that the dogs are essentially rectangular in cross-section having the longitudinal axis extending normal to a radial and in a plane defined by a lateral cross-section of the outlet. The fitting connected to the discharge hose for the second type of outlet includes a pair of diametrically opposed hooks for lockingly engaging a pair of the two pairs of diametrically opposed dogs; the configuration of the hooks corresponds with the lateral cross-section of the dogs to obtain a locking engagement. The fitting for a pair of dogs of one outlet will not lockingly engage a pair of dogs for the other type of outlet. Accordingly, the owner of a recreational vehicle must obtain a fitting for the discharge hose which is commensurate with the type of outlet employed on the recreational vehicle.

SUMMARY OF THE INVENTION

A universal coupling for attachment to a waste water outlet includes in one terminal end two pairs of diametrically opposed orthogonally oriented slots for engaging two diametrically opposed pairs of dogs disposed about one type of outlet. The other terminal end of the coupling includes two pairs of diametrically opposed slots for engaging two diametrically opposed pairs of dogs disposed about a second type of outlet. The sets of dogs of each type of outlet have different cross-sectional configurations and the respective pairs of slots in the coupling correspond therewith. A retaining mechanism within the coupling disengageably engages a discharge tube to locate the discharge tube to extend from one or the other terminal end of the coupling in order to permit the other end of the coupling to become engaged with the respective type of outlet. A discharge hose is attached to the extending end of the discharge tube to convey the waste water from the outlet to a remote location.

It is therefore a primary object of the present invention to provide a coupling for attaching a discharge hose to either of two conventional types of waste water outlets employed in a recreational vehicle.

Another object of the present invention is to provide a coupling having a relocatable discharge tube to permit attachment of one end of the coupling to a corresponding outlet.

Yet another object of the present invention is to provide a coupling with a different set of slots at each terminal end to permit attachment to the dogs of a corresponding one of either of two types of outlets.

Still another object of the present invention is to provide a sealed engagement between a discharge tube located within a coupling with an outlet to which the coupling is attached.

A further object of the present invention is to provide a coupling attachable to either one of two types of outlets by reversing the orientation of a discharge tube extending from the coupling.

A yet further object of the present invention is to provide a method for attaching a discharge hose to either of two types of waste water outlets of a recreational vehicle.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates a prior art first type of waste water outlet and corresponding fitting for attaching a discharge hose thereto;

FIG. 2 is a detail view of the hook and dog locking mechanism disclosed in FIG. 1;

FIG. 3 illustrates a prior art second type of waste water outlet and corresponding fitting for attaching a discharge hose thereto;

FIG. 4 is detail view of the hook and dog locking engagement shown in FIG. 3;

FIG. 5 illustrates a hollow section of the coupling of the present invention;

FIG. 6 illustrates a discharge tube secured in place upon engagement of the hollow section with a discharge outlet;

FIG. 7 is a cross-sectional view illustrating attachment of the coupling to an outlet of the first type;

FIG. 8 is a cross-sectional view illustrating attachment of the coupling to an outlet of the second type; and FIG. 9 illustrates a linear detail of the surface of the hollow section shown in FIG. 5.

DETAILED DESCRIPTION OF THE PREFERRED EMBODIMENT

Recreational vehicles include a tank for supplying water for various purposes. The resulting waste water is collected in a holding tank. From time to time the holding tank must be emptied. Generally, a gate valve discharging water through an outlet is used for such purpose. A fitting, supporting a discharge hose, is attached to the outlet to convey the waste water to a remote location. To prevent inadvertent spillage of the waste water intermediate the outlet and the fitting, a locking mechanism is employed therebetween.

Presently, a waste water outlet employed in recreational vehicles is one of two types. The first type, depicted in FIGS. 1 and 2, includes an outlet 10 having a sleeve 12 supporting pairs of diametrically opposed dogs 14, 16 and 18, 20. These dogs are in the shape of a peg cylindrical in cross-section and extending radially outwardly. The two sets of dogs are orthogonally oriented, as depicted. Fitting 30 includes a sleeve 32 for receiving and supporting a conventional 3-inch diameter discharge hose (not shown). Diametrically enlarged section 34 of fitting 30 slides over in supported engagement with sleeve 12 of outlet 10. A pair of diametrically opposed hooks, of which hook 36 is shown, include an undercut 38 for lockingly engaging a dog, such as dog 14 illustrated in FIG. 2.

To attach fitting 30 to outlet 10, enlarged section 34 of the fitting is slid onto sleeve 12 of the outlet and the fitting is rotated clockwise until both of hooks 36 engage one pair of pairs of dogs 14,16 or 18,20. After all of the waste water has been discharged, fitting 30 is rotated counterclockwise until hooks 36 disengage from the respective dogs and the fitting is slid longitudinally off sleeve 12. It may be noted that hooks 36 may be positioned to engage either pair of dogs. To assist in rotating fitting 30, radially extended uprights 39 are incorporated in the fitting.

A second type of outlet 40 is illustrated in FIGS. 3 and 4. The outlet includes a cylindrical surface 42 supporting two pairs of diametrically opposed dogs 44,46 and 48,50 which pairs of dogs are orthogonally oriented with respect to one another. Fitting 40, includes an annular section 52 whereby the fitting is in the nature of an apertured cap secured to conduit extending, via a gate valve or the like, from the waste water holding tank in a recreational vehicle. Each dog extends radially outwardly from surface 42 and has a cross-section elongated along its longitudinal axis, which axis is perpendicular to a radial of the outlet and in a plane commensurate with a lateral plane of the outlet. A fitting 60 for attachment to outlet 40 includes a sleeve 62 for receiving and supporting a waste water discharge hose (not shown) and a pair of diametrically opposed hooks, of which hook 64 is illustrated. Each hook includes an undercut 66 commensurate in shape with the cross-section of dogs 44, 46, 48, and 50. Radially oriented uprights 68 may be incorporated in fitting 60 to assist in rotating the fitting.

A radially expanded section 70 of fitting 60 has an internal diameter commensurate with the exterior diameter of surface 42 of outlet 40. Fitting 60 is attached to outlet 40 by sliding expanded section 70 onto surface 42. By rotating fitting 60 clockwise, hooks 64 will receive and lockingly engage the next adjacent pair of dogs. Discharge of waste water through outlet 40 will thereafter flow through fitting 60 and into an attached discharge hose. After discharge, fitting 60 is disconnected from outlet 40 by rotating it counterclockwise to disconnect the hooks from the dogs and sliding it longitudinally off the outlet.

From the above discussion, it will be apparent that outlets 10 and 40 are unique and different from one another. Such differences require that fittings 30 and 60 be configured to correspond with the respective outlet. Thus, fitting 30 is not useable with outlet 40 nor is fitting 60 useable with outlet 10. Since a manufacturer of a recreational vehicle may choose to incorporate a waste water outlet conforming with either outlet 10 or outlet 40, the purchaser, or any other user of the recreational vehicle, must have accessible the corresponding fitting or else discharge of the waste water to a remote location is not possible.

Referring to FIG. 5, there is illustrated a universal coupling 80 useable with either of the two conventional and widely used types of outlets depicted in FIGS. 1 and 3. The coupling includes a hollow section 82 and a discharge tube 84 depicted in FIG. 6. The configuration of hollow section 82 will be described with joint reference to FIGS. 5 and 10. Hollow section 82 includes terminal ends 86 and 88. Two pairs of diametrically opposed orthogonally oriented slots 90,92 and 94,96 are formed in terminal end 86. Each of these slots is configured to receive and lockingly engage a corresponding one of dogs 14, 16, 18, and 20 of outlet 10. Lips 98, 100, 102, and 104 are configured to ensure locking engagement between the slots and the corresponding dogs. Terminal end 88 includes two pairs of diametrically opposed orthogonally oriented slots 106,108 and 110,112. These slots are configured to lockingly receive corresponding dogs 44, 46, 48, and 50 of outlet 40. Lips 114, 116, 118, and 120 are configured to ensure locking engagement between the slots and the corresponding dog.

To engage coupling 80 with outlet 10, terminal end 86 is slid upon sleeve 12 and thereafter rotated clockwise to engage the slots with the corresponding two pairs of dogs, as shown in FIG. 8. Similarly, coupling 80 may be attached to outlet 40 by sliding terminal end 88 upon surface 42 and thereafter rotating the coupling clockwise to lockingly engage the slots with the corresponding two pairs of dogs, as shown in FIG. 7.

Hollow section 82 of coupling 80 includes an internal annular flange 122 having an interior diameter commensurate with the exterior diameter of discharge tube 84. The discharge tube includes a radially extending annular flange 124, which flange may be juxtaposed with flange 122 of hollow section 82.

As particularly illustrated in FIGS. 7 and 8, outlet end 126 of discharge tube 84 is penetrably inserted through flange 122 until flange 124 of the discharge tube is located adjacent flange 122. The choice of direction for inserting discharge tube 84 is a function of whether terminal end 86 or 88 is to be free to engage the respective one of outlets 10 and 40. An annular gasket 128 may be adhesively or otherwise secured to flange 124 to form a seal between the flange and the abutting end of the respective one of outlets 10 and 40 to prevent leakage of waste water between the discharge tube and the attached outlet. As denoted in phantom lines in FIGS. 7 and 8, discharge hose 130 is mounted upon cylindrical sleeve 132 of discharge tube 84 proximate outlet 126. A circular clamp, or the like, may be employed to ensure against inadvertent separation of the discharge hose from the discharge tube.

FIG. 7 depicts attachment of coupling 80 to surface 42 of fitting 40, including engagement of dogs 44, 50, and 46 with slots 106, 110, and 108, respectively. Gasket 128 is compressed between annular section 52 and flange 124 to ensure against leakage at the interconnection between outlet 40 and discharge tube 84. Flange 122 supports and retains discharge tube 84 in place within hollow section 82.

By reversing the terminal end through which discharge tube 84 extends, as shown in FIG. 8, terminal end 86 of coupling 80 may be engaged with outlet 10. In particular, slots 90, 94, 96, and 98 (not shown) lockingly engage dogs 14, 20, 16, and 18 (not shown), respectively. Discharge hose 130 is attached to sleeve 132, as described with respect to FIG. 7. Gasket 128 is disposed between the end of sleeve 12 of outlet 10 and flange 124 of the discharge tube to prevent leakage at this junction. Flange 122 supports and locates discharge tube 84 with respect to hollow section 82.

Accordingly, coupling 82 may be employed with either type of outlet 10 or 40 by simply relocating discharge tube 84 to have it extend from the terminal end of hollow section 82 which is not to be engaged with the respective two sets of dogs.

Discharge tube 84 is illustrated as having a bend therein. Such bend may be totally absent, in which event the discharge tube is a straight section. Alternatively, the bend may be approximately 30 degrees, as shown, 45 degrees, 90 degrees, or at any angle which would render discharge of waste water into the discharge tube most effective.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A coupling for engaging either of a first waste water outlet having a first configuration of a set of dogs or a second waste water outlet having a second configuration of a set of dogs to direct waste water into a discharge hose, said coupling comprising in combination:
   a) a hollow section having opposed first and second terminal ends, said hollow section including an interior surface;
   (b) a first set of slots disposed at said first terminal end for engaging in locking engagement with said first configuration set of dogs associated with the first waste water outlet;
   (c) a second set of slots disposed at said second terminal end for engaging in locking engagement with said second configuration set of dogs associated with the second waste water outlet;
   (d) a discharge tube having an inlet end and an outlet end for directing waste water flowing into said hollow section, through said outlet end and into the discharge hose, said discharge tube including a radial first flange disposed at said inlet end positionable in juxtaposed relationship with a second flange; and
   (e) a retainer mechanism for retaining said inlet end of said discharge tube within said hollow section and for extending said outlet end from said hollow section, said retainer mechanism including said second flange extending inwardly radially from said interior surface.

2. The coupling as set forth in claim 1 including a gasket disposed intermediate said second flange and the engaged water outlet.

3. The coupling as set forth in claim 2 including a discharge hose attached to said outlet end of said discharge tube.

4. The coupling as set forth in claim 2 wherein each slot of said first set of slots includes a lip for lockingly engaging the respective dog.

5. The coupling as set forth in claim 4 wherein each slot of said second set of slots includes a further lip for lockingly engaging the respective dog.

6. A coupling useable with either of a first conventional water discharge outlet or a second conventional water discharge outlet that may be used with a recreational vehicle to interconnect the discharge outlet with a discharge hose, said coupling comprising in combination:
   (a) an hollow section having a first terminal end selectively engageable with one of the first and second water discharge outlets and a second terminal end selectively engageable with the other of the first and second water discharge outlets, said hollow section including an interior surface;
   (b) a discharge tube having an inlet end and an outlet end extending from said hollow section to support the discharge hose for discharging waste water flowing into said hollow section and through said outlet end into the discharge tube, said discharge tube including a radial first flange disposed at said inlet end positionable in juxtaposed relationship with a second flange; and
   (c) a retainer mechanism for retaining said inlet end of said discharge tube within said hollow section and for extending said outlet end of said discharge tube from said hollow section, said retainer mechanism including said second flange extending inwardly radially from said interior surface.

7. The coupling as set forth in claim 6 including a gasket disposed intermediate said second flange and the engaged discharge outlet.

8. The coupling as set forth in claim 6 wherein each of said first and second terminal ends includes engaging means for lockingly engaging the respective one of the first and second water discharge outlets.

9. The coupling as set forth in claim 8 wherein said hollow section includes an interior surface and wherein said retainer mechanism includes a first flange extending inwardly radially from said interior surface and wherein said discharge tube includes a radial second flange disposed at said inlet end positionable in juxtaposed relationship with said first flange.

10. The coupling as set forth in claim 9 including a gasket disposed intermediate said second flange and the engaged discharge outlet.

11. A method for interconnecting a discharge hose through a coupling with either of two different but conventional types of water discharge outlets that may be used with a recreational vehicle, said method comprising the steps of:
   (a) selectively lockingly engaging a terminal end of the coupling corresponding with the type of discharge outlet present at the recreational vehicle, said step of lockingly engaging including the step of mating slots disposed at a terminal end of the coupling with dogs extending from the discharge outlet;
   (b) positioning one end of a discharge tube within the coupling to permit extension of the other end of the discharge tube from the other terminal end of the coupling not in engagement with the discharge outlet;
   (c) retaining the one end of the discharge tube within the coupling; and
   (d) attaching the discharge hose to the other end of the discharge tube extending from the coupling.

12. The method as set forth in claim 11 wherein said step of lockingly engaging includes the step of sliding the coupling onto the discharge outlet.

13. The method as set forth in claim 12 including a step of rotating the coupling relative to the discharge outlet after exercising said step of sliding.

* * * * *